United States Patent [19]
Bloomfield

[11] Patent Number: 5,345,550
[45] Date of Patent: Sep. 6, 1994

[54] USER-MODIFIABLE POPUP MENUS FOR OBJECT ORIENTED BEHAVIOR

[75] Inventor: Marc A. Bloomfield, Lighthouse Point, Fla.

[73] Assignee: International Business Machines Corporation, Armonk, N.Y.

[21] Appl. No.: 996,983

[22] Filed: Dec. 23, 1992

[51] Int. Cl.$^5$ ............................................. G06F 3/03
[52] U.S. Cl. .................................... 395/156; 395/157; 395/161
[58] Field of Search ............... 395/159, 160, 161, 157, 395/156, 155, 158

[56] References Cited

U.S. PATENT DOCUMENTS

| | | | |
|---|---|---|---|
| 4,974,160 | 11/1990 | Bone et al. | 395/161 |
| 5,121,477 | 6/1992 | Koopmans et al. | 395/156 X |
| 5,220,675 | 6/1993 | Padawer et al. | 395/155 X |
| 5,261,042 | 11/1993 | Brandt | 395/155 X |

OTHER PUBLICATIONS

Microsoft Windows User's Guide (Trademark of Microsoft Cor.) pp. 9, 27, 30–31, 88–91.

*Primary Examiner*—Phu K. Nguyen
*Assistant Examiner*—Cliff Nguyen Vo
*Attorney, Agent, or Firm*—Bruce D. Jobse; Paul W. O'Malley; Andrew J. Dillon

[57] ABSTRACT

A graphical user interface for a data processing system includes a method of generating a popup menu of actions allowed on an object represented in the graphical user interface. The method includes the steps of interrogating extended attributes for an object and each elder object to the object. Interrogation is for default actions and suppression markers. With each interrogation step the method adds actions linked to the object or to an elder object by another application and removes actions identified by suppression markers by another application from an interim list. After interrogation of the layers for modifications from other applications, the method provides for determining if any user defined actions and suppression markers are present for the object. If yes, the user defined actions are added to the interim list and actions matched by the suppression markers are removed from the interim list. A popup menu is then generated from the interim list.

7 Claims, 13 Drawing Sheets

USER-MODIFIABLE POPUP MENUS FOR OBJECT ORIENTED BEHAVIOR

BACKGROUND OF THE INVENTION

1. Cross-Reference to Related Applications

The present patent application is one of a group of copending applications which concern the same overall personal computer system but which individually claim different inventive concepts embodied in such personal computer system. These related patent applications are specifically incorporated by reference herein, and are more particularly described as follows:

(1) Application Ser. No. 07/854,171, entitled "Method for Providing Conditional Cascading in a Computer System", having Attorney Docket Number of BC9-92-046, the inventors being Bloomfield et al.;

(2) Application Ser. No. 07/854,257, entitled "Method for Providing Size Adjustment for a Maximized Window in a Computer System Graphical User Interface", having Attorney's Docket Number of BC9-92-048, the inventor being Bloomfield;

(3) Application Ser. No. 07/855,369, entitled "Palette Manager In A Graphical User Interface Computer System" having Attorney's Docket Number of BC9-92-044, the inventors being Bloomfield et al.;

(4) Application Ser. No. 07/996,223 entitled "Method Of Generating A Hierarchical Window List In A Graphical User Interface" having Attorney's Docket Number of BC9-92-149, the inventors being Bloomfield et al.;

(5) Application Ser. No. 07/996,422, entitled "Method Of Transferring Programs From Action Oriented GUI Paradigm To Object Oriented GUI Paradigm" having Attorney's Docket Number of BC9-92-150, the inventor being Bloomfield;

(6) Application Ser. No. 07/993,875, entitled "Apparatus And Method For Manipulating An Object In A Computer System Graphical User Interface" having Attorney's Docket Number of BC9-92-153, the inventors being Bloomfield et al.; and (7) Application Ser. No. 07/855,366, entitled "Method For Providing A Readily Distinguishable Template And Means Of Duplication Thereof In A Computer System Graphical User Interface" filed Mar. 20, 1992, the inventors being Bloomfield et al.

TECHNICAL FIELD

This invention relates to personal computer systems and in particular to a method and device for improving a graphical user interface (GUI) on a personal computer system.

DESCRIPTION OF THE RELATED ART

Personal computer systems in general and IBM personal computers in particular have attained widespread use in contemporary society. Personal computer systems can usually be defined as a desktop, floor standing, or portable microcomputer that consists of a system unit having a single system processor, a display monitor, a keyboard, one or more diskette drives, a fixed disk storage, and an optional printer. One of the distinguishing characteristics of these systems is the use of a motherboard or system planar to electrically connect these components together. These systems are designed primarily to give independent computing power to a single user and are inexpensively priced for purchase by individuals or small businesses.

Examples of such personal computer systems are IBM's PERSONAL COMPUTER AT, IBM's PERSONAL SYSTEM/2 Models 25, 30, 35, 40 SX, 55 SX, 57 SX, 70, 80, 90 and 95, and IBM PERSONAL SYSTEM/1 computers. These systems can be classified into two general families. The first family, usually referred to as Family I Models, use a bus architecture exemplified by the IBM PERSONAL COMPUTER AT and other "IBM compatible" machines. The second family, referred to as Family II Models, use IBM's MICRO CHANNEL bus architecture exemplified by IBM's PERSONAL SYSTEM/2 Models 55 SX through 95.

Beginning with the earliest personal computer system of the Family I models, such as the IBM Personal Computer, it was recognized that the operating system would be of utmost importance. Realizing that market acceptance was a primary goal, IBM chose a rather simple text oriented operating system which was suited for the level of hardware technology of the time. The operating system chosen was named DOS which is the acronym for disk operating system. The limited objectives for DOS at the time were non-cryptic commands, English language error messages (instead of error codes, small memory size (12 Kbyte) and reasonable performance. DOS served well for the Family I machines and even into the basic Family II models, but as memory and hardware prices declined and performance increased a more user friendly intuitive operating system became possible. Beginning in 1986, IBM started development of a graphical user interface (GUI) designed to mask the complexity of the hardware technology advances and present to the user an intuitive, flexible, and easy-to-use system. This operating system was named OS/2 and was developed for the more advanced technology of the Family II models.

Additionally, other manufactures have investigated and used other types of GUI systems. One of the earliest in the personal computing area was Xerox's STAR system that presented the user with icons representing a particular operation or software application. Later, APPLE's Macintosh system added features such as windows and drag and drop to further the intuitive nature of the graphical user interface for APPLE's line of computers. Presently, MICROSOFT's WINDOWS provides a graphical user interface on IBM compatible machines.

With GUI systems, the computer system is controlled using a pointing device such as a mouse. The pointing device controls the location of a pointer that appears on the screen of the computer's display device. Elements on the screen such as icons, which are graphical representations of various modules such as disk drives, applications and documents, or windows, which are rectangular areas on the screen in which applications or documents can be viewed, may be manipulated using the mouse. In this way, the underlying devices which the elements represent may be controlled.

As GUI systems developed, producing the underlying elements such as windows and icons has become well known. In fact, publicly available tools such as icon and window editors are now available to actually create the visual display. For example, Conklin, OS/2 Notebook, (Microsoft Press, 1990) pp. 159-255 discusses OS/2 software tools.

As new models of the personal computer family were introduced, OS/2 has been updated and enhanced. One of the major features of the OS/2 Version 2.0 operating system in which the present invention is incorporated is a workplace shell featuring a desktop metaphor. Briefly, the desktop metaphor presents the user with the look of a desktop. Devices such as a modem or printer are represented by icons. Computer files can appear as icons grouped together into folders. Folders can be placed into a predefined space such as a window. Application programs appear as unique icons that can be activated when a pointer, positioned by the movement of a mouse over the icon, is energized usually by double clicking one of the mouse buttons.

Applications are the programs that apply to the computer user's work, such as inventory control or document authorship. They are implemented through executable files (distinguished here from data files). Applications are represented to a user by the graphical user interface organized by folders. Applications represent actions to be taken with respect to something else. For example, a word processing program is a tool for editing a data file which contains a document. The application permits the user to open the document and change its contents, but the application is itself something of an abstraction. It would be more intuitive simply to open the document. Representing applications in the desk top metaphor makes the interface action oriented as opposed to an object oriented user interface. Introducing action oriented user interface aspects to the desktop metaphor is somewhat inconsistent with that metaphor.

An office worker typically is interested in the things made using applications, not in the applications themselves. Thus practical problems confront a user when aspects of the graphical user interface become action oriented. First, a user must go to a separate application for each new action taken on a user data file. Because of this, the flow of the user's work on a user data file is interrupted while the user looks for applications to employ on the user data file and directs the computer to begin execution of the application. While different applications may relate to the same user data file, definition of groupings of applications precede creation of the user data file. Groupings of applications may have been selected to anticipate requirements of some generic data file, but are not driven by any given user data file unless the user takes the time to specifically tailor the application grouping. As a result, the tools that have application to a given user data file are found in an application grouping only as a result of happenstance or active user intervention.

Authors of specific applications have partially addressed the problem of the contemporary "mixed metaphor" graphic user interfaces through application based pulldown and popup menus. Such menus appear on a display screen at user request and can be used to present a secondary set of options to the user. Vendor supplied menus based in the source code of an application can group useful actions together, but the approach is limited. The contents of the menu are both predetermined and fixed by the application programmer. The contents of the menu cannot be modified by another application, particularly from a different vendor, or by the user.

It is desirable to organize presentation of applications to users in a consistent manner and in a manner which provides convenient access from user data files. Such an arrangement must work automatically. The end user must however be able to reorganize his or her existing applications for presentation within the new presentation scheme. Such a system should be an aid to ease of use, training and productivity.

SUMMARY OF THE INVENTION

One object of the present invention is to provide a method of providing a consistent object oriented graphical user interface for a computer.

Another object of the present invention is to provide a method of organizing permitted actions for an object in a consistent and easy to use manner.

Yet another objective of the present invention is to provide for ease of use of a graphical user interface.

In accordance with one embodiment of the present invention, a graphical user interface for a data processing system includes a method of generating a popup menu of actions allowed on an object represented in the graphical user interface. The method includes the steps of interrogating extended attributes for the object and each elder object from to the object the eldest object down to and including the object itself. Interrogation locates default actions and suppression markers noted in the extended attributes. With each interrogatory step the method adds actions linked to the object or to an elder object by another application and removes actions identified by suppression markers by another application from an interim list. After interrogation of the layers for modifications from other applications, the method provides for determining if any user defined actions and suppression markers are present for the object. If yes, the user defined actions are added to the interim list and actions matched by the suppression markers are removed from the interim list. A popup menu is then generated from the interim list.

User modification of a popup menu is provided through an editor to extended attributes fields for objects stored on a storage medium. The editor allows user selection of one of a plurality of editing functions including creation of a new action, change of an existing action and removal of an existing action for an object. Responsive to selection of the step of creating a new action the user is further prompted to define the action and to name the action. Extended attributes are then stored for the object identifying the new action. Responsive to selection of the step of changing an action permitted an object, the user may select a new name. If the action is user created the user is allowed to change the action and the result is stored over the old action as extended attributes. If the action was not user defined, a marker is stored as extended attributes so that the changed name is recovered at time of request for the popup menu. Finally, if removal of an action is requested, the method first determines if the action was user defined. If yes, the action may be erased from extended attributes. If no, a suppression marker is listed in the extended attributes field to suppress (or delete) listing of the action in the interim list. Submenus may be included and treated as actions in any popup menu.

BRIEF DESCRIPTION OF THE DRAWINGS

The foreground aspects and other features of the present invention are explained in the following written description, taken in connection with the accompanying drawings, wherein.

DETAILED DESCRIPTION OF THE INVENTION

The following detailed description is of the best presently contemplated mode for carrying out the invention. This description is not to be taken in a limiting sense but is made merely for the purpose of illustrating the general principles of the invention since the scope of the invention is best defined by the appending claims.

I. Operation Of The Computer System—User's Perspective

Figure 1:
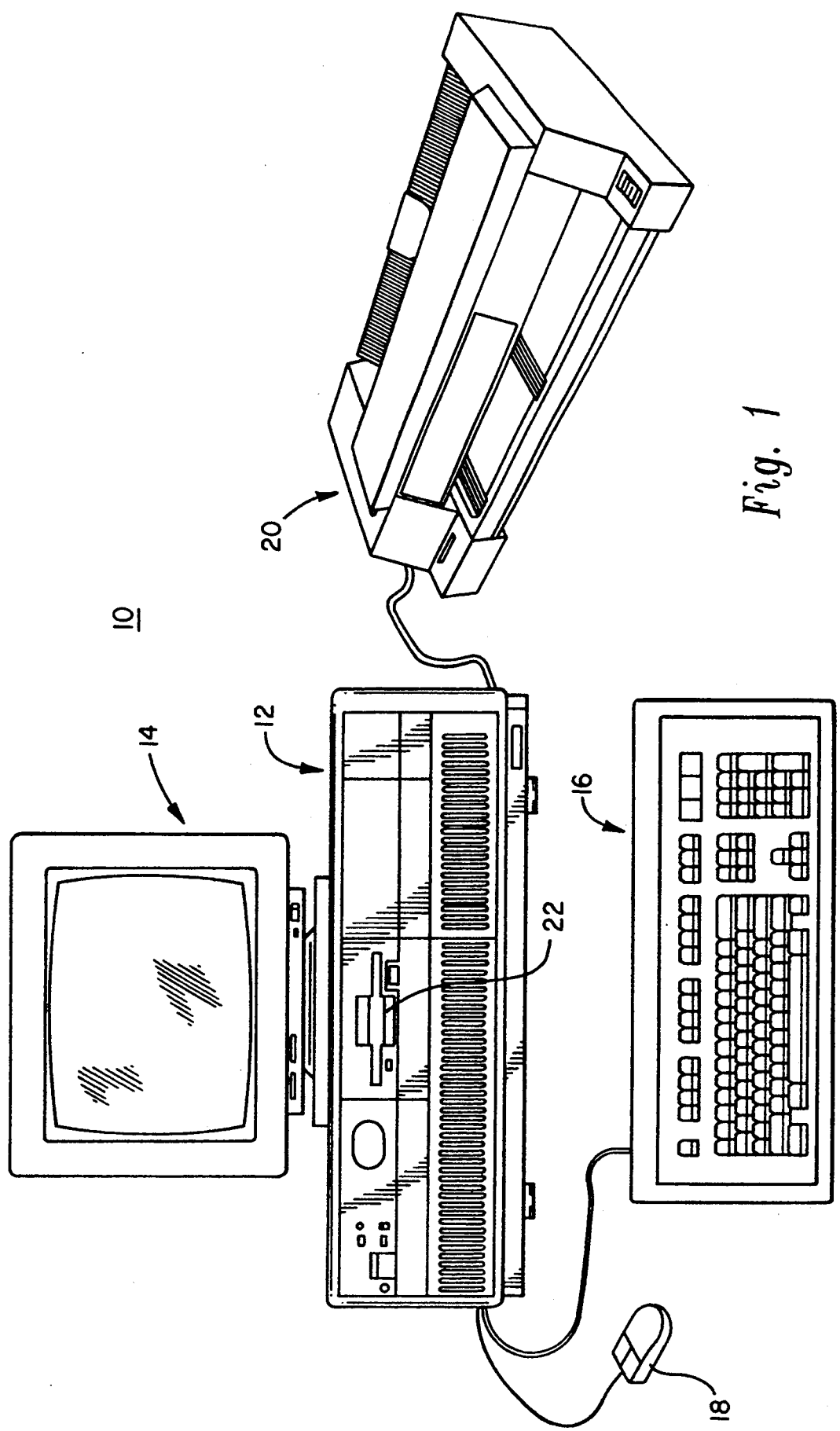
FIG. 1 shows a personal computer system in which the present invention can be employed.

Prior to relating the methodology and structure of the present invention, a summary of the operation in general of a typical personal computer system may merit review. Referring now to the drawings, and in particular to FIG. 1, there is shown a Personal Computer System 10 in which the present invention can be employed. As shown, the Personal Computer System 10 comprises a number of components which are interconnected together. More particularly, a system unit 12 is coupled to and can drive an optional monitor 14 (such as a conventional video display). A system unit 12 can also be optionally coupled to input devices such as a PC keyboard 16 or a mouse 18. Mouse 18 includes right and left buttons (not shown). The left button is generally employed as the main selector button and is alternatively referred to as the first mouse button or mouse button 1. The right button is typically employed to select auxiliary functions as explained later. The right mouse button is alternatively referred to as the second mouse button or mouse button 2. An optional output device such as a printer 20 can also be connected to the system unit 12. Finally the system unit 12 may include one or more mass storage devices such as the diskette drive 22.

As will be described below, the system unit 12 responds to input devices such as the PC keyboard 16, the mouse 18, or local area networking interfaces. Additionally, input/output devices, such as the diskette drive 22, display 14, printer 20, and local area network communication system are connected to the system unit 12 in a manner well known. Of course, those skilled in the art are aware that other conventional components can also be connected to the system unit 12 for interaction therewith. In accordance with the present invention, the computer system 10 includes a system processor that is interconnected to a random access memory (RAM), a read only memory (ROM), and a plurality of I/O devices.

In normal use, the personal computer system can be designed to give independent computing power to a small group of users as a server or a single user and is inexpensively priced for purchase by individuals or small businesses. In operation, the system processor functions under an operating system, such as IBM's OS/2 operating system or DOS. This type of operating system includes a BIOS interface between the I/O devices and the operating system. BIOS, which can be stored in a ROM on a motherboard or planar, includes diagnostic routines which are contained in a power on self test section referred to as POST.

II. Organization of the Computer System

Figure 2:
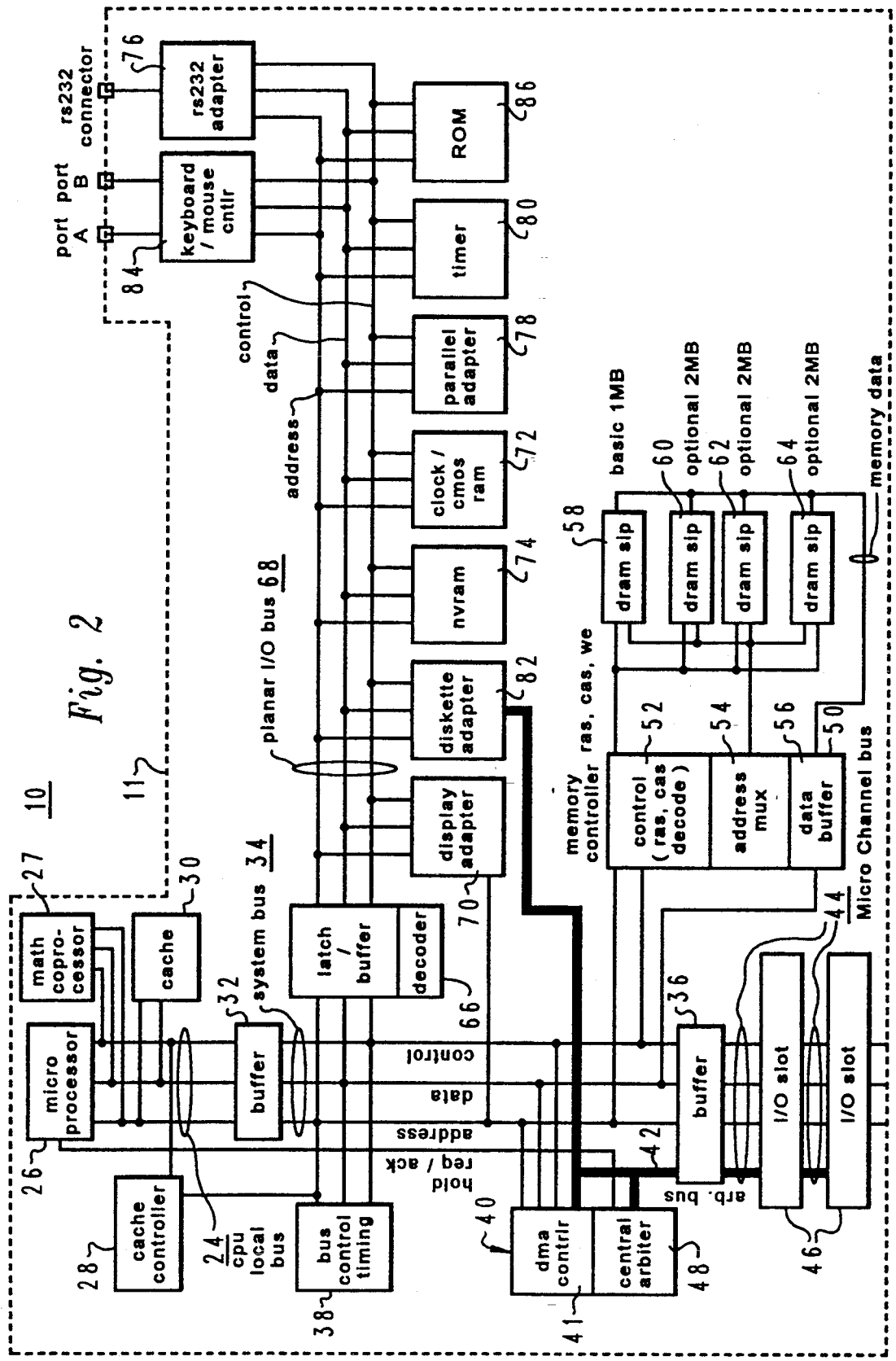
FIG. 2 shows a system block diagram for the personal computer system of FIG. 1.

Prior to relating the above structure to the present invention, a summary of the operation in general of the Personal Computer System 10 may merit review. Referring to FIG. 2, there is shown a block diagram of the Personal Computer System 10 illustrating the various components of the Computer System 10 in accordance with the present invention. FIG. 2 further illustrates components of the planar 11 and the connection of the planar 11 to the I/O slots 46 and other hardware of the Personal Computer System 10. Connected to the planar 11 is the system central processing unit (CPU) 26 comprised of a microprocessor which is connected by a high speed CPU local bus 24 through a bus controlled timing unit 38 to a memory control unit 50 which is further connected to a volatile random access memory (RAM) 58. While any appropriate microprocessor can be used for CPU 26, one suitable microprocessor is the 80386 which is sold by Intel.

While the present invention is described hereinafter with particular reference to the system block diagram of FIG. 2, it is to be understood at the outset of the description which follows, it is contemplated that the apparatus and methods in accordance with the present invention may be used with other hardware configurations of the planar board. For example, the system processor could be an Intel 80286 or 80486 microprocessor. There particular microprocessors can operate in a real addressing mode or a protected addressing mode. Each mode provides an addressing scheme for accessing different areas of the microprocessor's memory.

Returning now to FIG. 2, the CPU local bus 24 (comprising data, address and control components) provides for the connection of 26, an optional math coprocessor 27, a cache controller 28, and a cache memory 30. Also coupled on the CPU local bus 24 is a buffer 32. The buffer 32 is itself connected to a slower speed (compared to the CPU local bus) system bus 34, also comprising address, data and control components. The system bus 34 extends between the buffer 32 and a further buffer 36. The system bus 34 is further connected to a bus control and timing unit 38 and a Direct Memory Access (DMA) unit 40. The DMA unit 40 is comprised of a central arbitration unit 48 and a DMA controller 41. The buffer 36 provides an interface between the system bus 34 and an optional feature bus such as the Micro Channel bus 44. Connected to the bus 44 are a plurality of I/O slots 46 for receiving Micro Channel adapter cards which may be further connected to an I/O device or memory. An arbitration control bus 42 couples the DMA controller 41 and central arbitration unit 48 to the I/O slots 46 and diskette adapter 82. Also connected to system bus 34 is a memory control unit 50 which is comprised of a memory controller 52, an address multiplexer 54, and a data buffer 56. The memory control unit 50 is further connected to a random access memory as represented by the RAM module 58. The memory controller 52 includes the logic for mapping addresses to and from the microprocessor 26 to particular areas of RAM 58. While the microcomputer system 10 is shown with a basic 1 megabyte RAM module, it is understood that additional memory can be interconnected as represented in FIG. 2 by the optional memory modules 60 through 64.

A further buffer 66 is coupled between the system bus 34 and a planar I/O bus 68. The planar I/O bus 68 includes address, data, and control components respectively. Coupled along the planar bus 68 are a variety of I/O adapters and other peripheral components such as the display adapter 70 (which is used to drive an optional display 14), a clock 72, nonvolatile RAM 74 (hereinafter referred to as NVRAM), a RS232 adapter 76, a parallel adapter 78, a plurality of timers 80, a diskette adapter 82, a PC keyboard/mouse controller 84, and a read only memory (ROM) 86. The ROM 86 includes BIOS which provides the user transparent communications between many I/O devices.

The clock 72 is used for time of day calculations. NVRAM 74 is used to store system configuration data. That is, the NVRAM will contain values which describe the present configuration of the system. For example, NVRAM contains information which describe the capacity of a fixed disk or diskette, the type of display, the amount of memory, etc. Of particular importance, NVRAM will contain data which is used to describe the system console configuration; i.e. whether the PC keyboard is connected to the keyboard/mouse controller 84, a display controller is available or the ASCII terminal is connected to the RS232 adapter 76. Furthermore, these data are stored in NVRAM whenever a special configuration program is executed. The purpose of the configuration program is to store values characterizing the configuration of this system to NVRAM which are saved when power is removed from the system.

Connected to keyboard/mouse controller 84 are ports A and B. These ports are used to connect a PC keyboard (as opposed to an ASCII terminal) and mouse to the PC system. Coupled to RS232 adapter unit 76 is an RS232 connector. An optional ASCII terminal can be coupled to the system through this connector.

III. OS/2 Version 2 Operating System—Graphical User Interface

Figure 3:
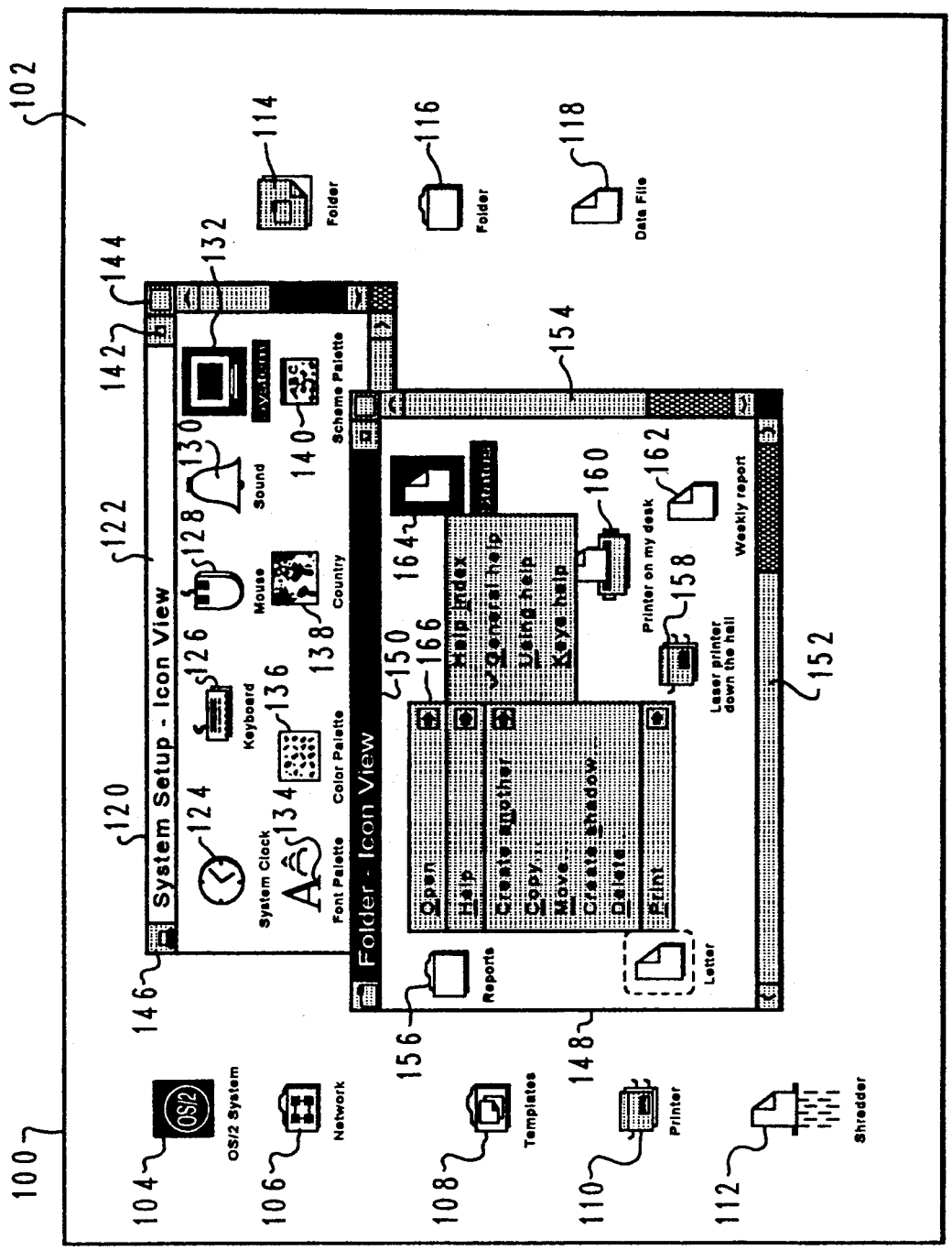
FIG. 3 is a screen representation of the desktop metaphor generated by a graphical user interface.

It may be appropriate at this point to briefly review selected features of the OS/2 version 2.0 GUI. FIG. 3 illustrates a typical display screen 100 which appears when using the OS/2 version 2.0 operating system. The viewing area within screen 100 is referred to as desktop 102. Desktop 102 includes a plurality of user selectable icons which are conveniently selected by double clicking the left button of the mouse. Each icon represents an application, function or file storage area which the user can select. For example, as seen in FIG. 3, desktop 102 includes an OS/2 System icon 104, a Network icon 106, a Templates icon 108, a Printer icon 110, a Shredder icon 112, a Folder icon 114, another Folder icon 116 and a Data file 118.

When the user selects an icon by double clicking the same, the corresponding function is activated and the icon becomes highlighted. For example, when the OS/2 System icon 104 is selected on desktop 102, OS/2 System icon 104 becomes highlighted as illustrated in FIG. 3. When OS/2 System icon 102 is so selected, a corresponding window 120 of further possible selections is displayed on desktop 102. More specifically, window 120 includes a title bar 122 in which the name of the selected window is designated in text as "System Setup - Icon View". In this particular example, the selectable icons appearing within System Startup window 120 includes a System Clock icon 124, a Keyboard icon 126, a Mouse icon 128, a Sound icon 130, a System icon 132, a Font Palette icon 134, a Color Palette 136, a Country icon 138 and Scheme Palette 140.

The upper right corner of window 120 includes a small box 142 which, if selected by the user, minimizes window 120, thus dismissing window 120 and returning window 120 to the icon 104 representation thereof. The upper right corner of window 120 also includes a box 144, larger than box 142 and which is selected by the user, maximizes window 120, thus causing window 120 to occupy substantially all of desktop 102.

The icon representation 146 appearing in the upper left corner indicates the type of window to which it corresponds. For example, window 120 is a system setup window; accordingly, the icon appearing in the upper left corner of window 120 is representative of the System icon. Had system clock icon 124 been selected, the icon appearing in the upper left corner of its window would be representative of a clock.

Since title bar 122 of window 120 is depicted in white or "not-highlighted", this indicates the window 120 is not presently selected or active. Rather the user has clicked on and selected Folder 114 as indicated by its highlighted nature. When Folder 114 was so selected, a corresponding Folder window 148 was opened on desktop 102 in overlapping fashion with respect to the earlier opened System Setup window 120. The title bar 150 of window 148 indicates the title of window 148 as being "Folder-Icon View". It is noted that title bar 150 of window 148 is highlighted, thus indicating that window 148 is presently the active window.

Window 148 includes a horizontal scroll bar 182 which can be engaged by the user to scroll through the contents of window 148 from left to right and from right to left all within the particular viewing area defined by the chosen dimensions of window 148. Window 148 also includes a vertical scroll bar for scrolling through the window contents vertically. Other windows generated by the operating system also include this feature. For purposes of example, window 148 includes a Reports icon 186, a Laser Printer Down The Hall icon 158, a Printer On My Desk icon 160, a Weekly Report icon 162 and a Status icon 164.

IV. OS/2 Version 2.0 Operating System—File System Architecture

The disk operating system (DOS) supplied with first generation IBM personal computers allocated space on a disk storage device through a file allocation table (FAT). Access to the FAT using a file name allows the computer to recover addresses for all sectors used to store a file. This association of a file name with sectors defines two attributes of a file, its name and address. The DOS directory structure allowed definition of further file attributes including, directory membership, creation or last revision date and size. The attribute stored in the file allocation table and the directory structure, though functionally attached to files are physically distinct from user files and are kept at fixed locations on a disk so that the computer need not go to an address to access file attributes.

DOS based graphical user interfaces, including the Microsoft Windows system, and the Presentation Manager for the IBM OS/2 operating system have ways to determine which data files are related to particular programs. Application programs were designed to supply extended attributes into association tables accessible to the operating system. These tables specify data file types cognizable by the program, a title for the data file types and an icon to represent the program in the GUI. The association table for a program would include a file name filter (i.e. a standard DOS file name extension to attach to user data files created using the program) and the icon. Extended attributes may be accessed, in an OS/2 operating environment, without opening a file. The present invention uses the information present in the association tables for such action oriented paradigm application to make the graphic user interface compatible with an object oriented paradigm.

The IBM OS/2 operating system supplements the features of DOS in several ways. The OS/2 operating system adds a high performance file system (HPFS) to the FAT. HPFS greatly expands on the file system name space of DOS and maps those names to the FAT. The application program interface (API) for the OS/2 operating system is also different than that for DOS. HPFS and file system API allow applications to attache additional extended attributes to file objects through modules called file system drivers. Extended attributes can include application notes about specific file objects. They can also be used to append information to a file in the form of extents.

Through extended attributes for an object, the OS/2 version 2.0 operating system allows an object to maintain a list of actions (i.e. applications) which can be performed on the object. This list is presented to a user in an object specific popup menu. Prior to the present invention, the list contents was predetermined by the source code for the object. The only way to change the list was to change the source code. In the OS/2 operating system an object can be any passive entity that contains or receives data, for example, blocks, fields, files, directories, displays, keyboards, network nodes, pages and printers.

V. Presentation of Objects, Popup Menus and Menu Editor

Figure 4:
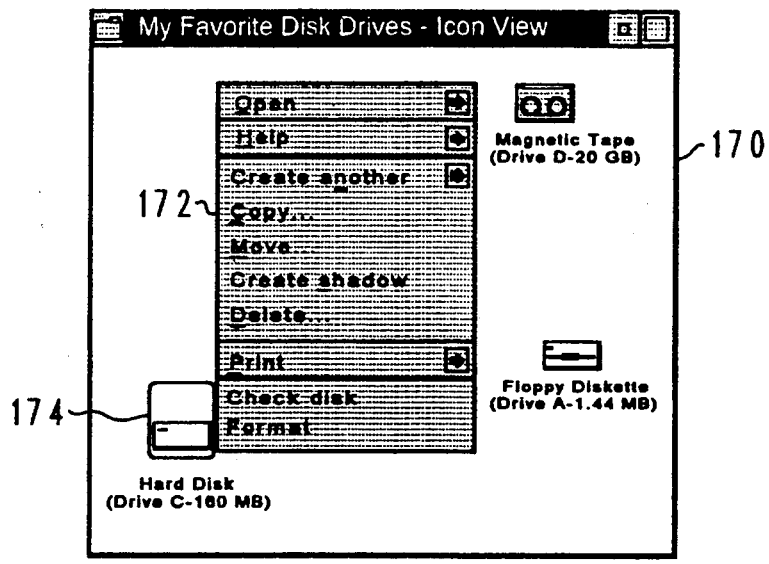
FIG. 4 is a screen representative of a popup menu for an object in a graphical user interface.

FIG. 4 illustrates a window 170 opened for display on a display device. In window 170 a popup menu 172 has been opened for a hard drive icon 174. The list includes a plurality of actions such as "Check Disk" and "Format", which are part of the program source code for a disk drive object represented by the icon. A user selects actions from menu 172 by moving a pointer controlled by a mouse to an item and clicking twice on the mouse. Selection of the format operation would result in all of the contents of a hard drive being erased. The editor functions of the invention described below allow suppression of actions and additions of actions to the menu. Selection of some action items, such as Print, may result in generation of submenus.

Figure 5:
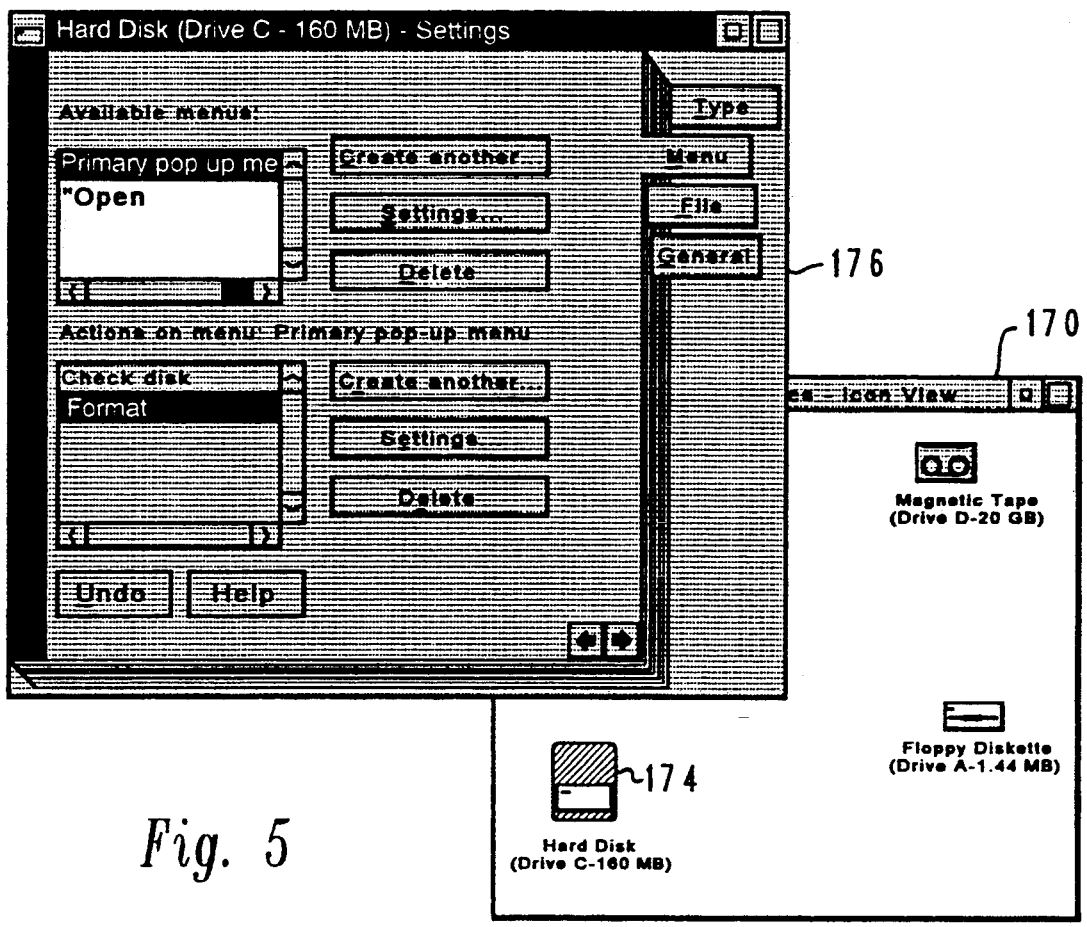
FIG. 5 is a screen representation of a popup menu editor for the object in an opened window.
Figure 6:
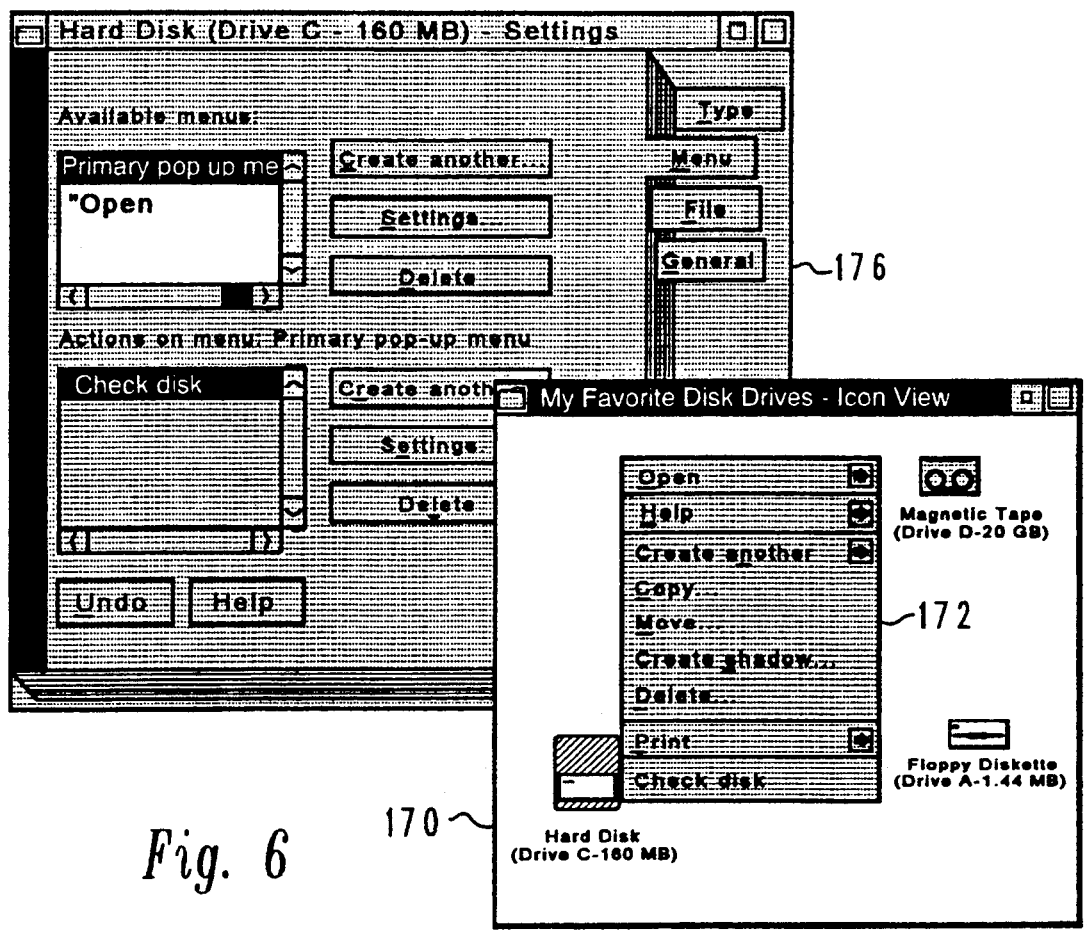
FIG. 6 is a screen representation of a modified popup menu for an object icon in a graphical user interface.

FIG. 5 depicts an editor window 176 generated for modification of the hard disk object popup menu 172. Through editor interface 176 a user can select editing functions to create a new submenu, change the settings of an existing item, or delete a menu item. The Format item is highlighted to indicate its selection. "Delete" may now be selected to remove the Format option from the menu. As explained below, the Format application provided by the operating system is not actually erased or removed. It is simply made unavailable respecting the hard disk drive through the graphical user interface as illustrated in FIG. 6, where menu 172 has been modified to reflect the selection of "Delete" made through editor window 176.

Figure 7:
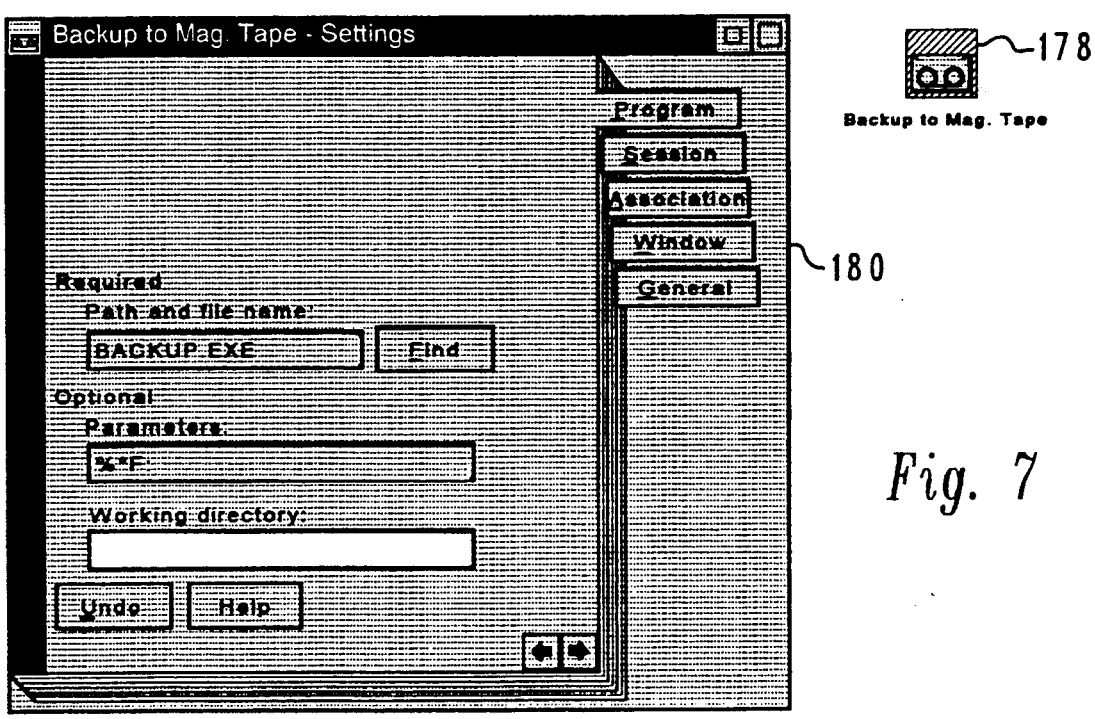
FIG. 7 is a screen representation of a settings editor for an application program accessed from a graphical user interface.
Figure 8:
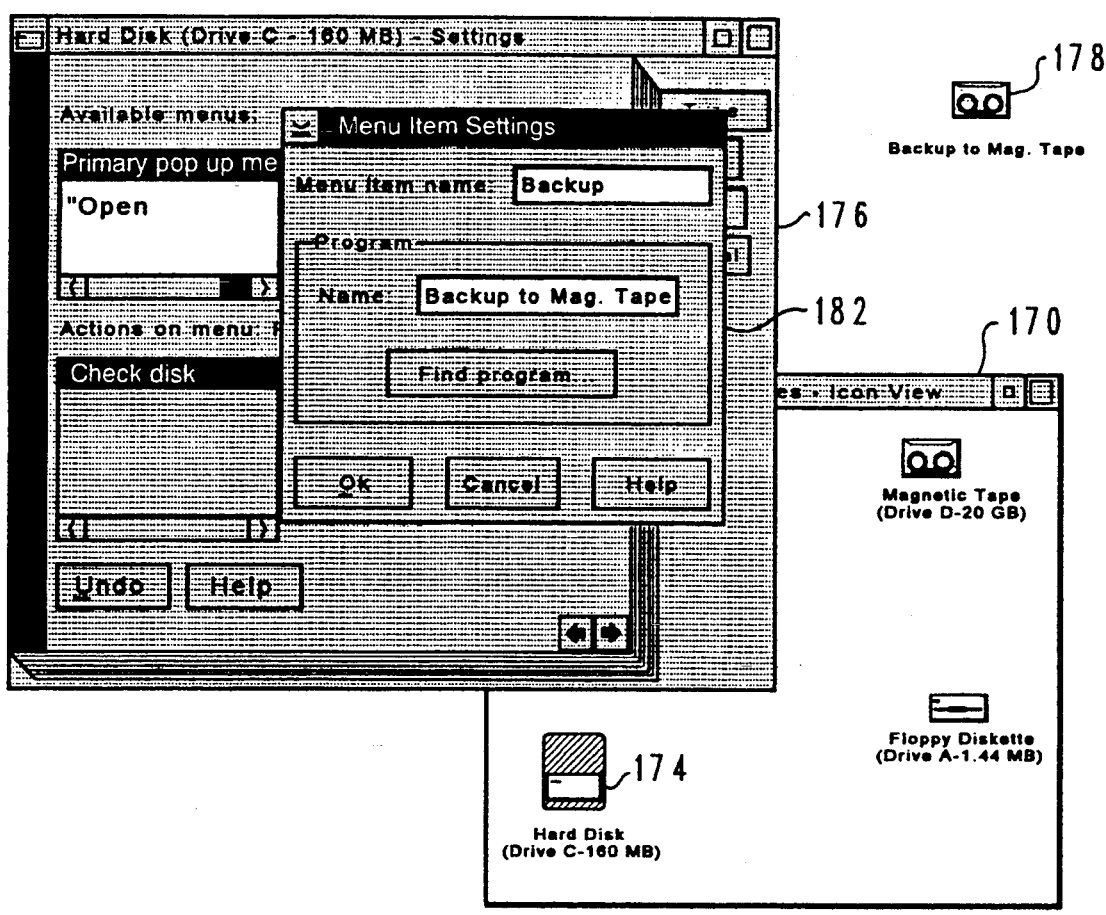
FIG. 8 is a screen representation of a menu item settings editor opened within a menu editor.
Figure 9:
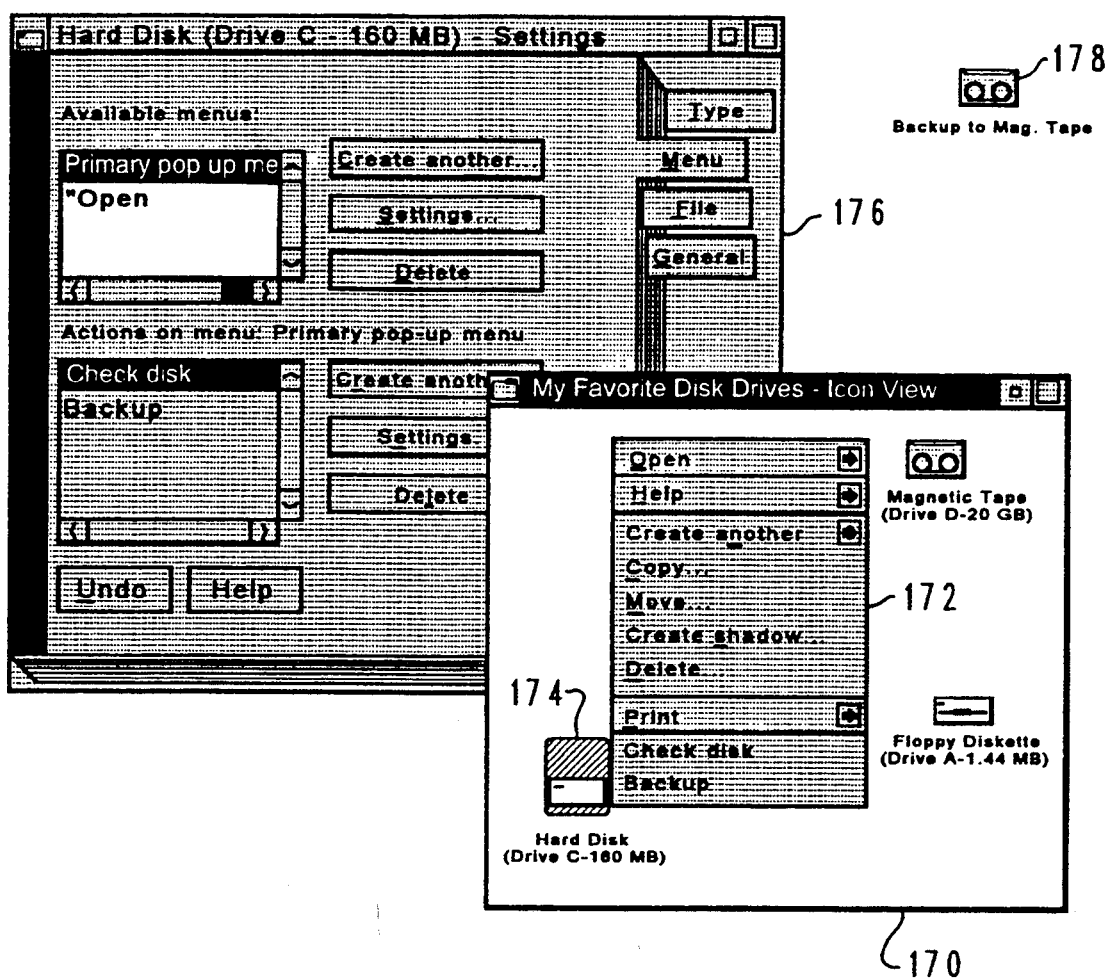
FIG. 9 is a screen representation of a user modified popup menu for an object in a graphical user interface.

FIGS. 7, 8 and 9 depict addition of a menu item to popup menu 172. Application icon 178 refers to a program for backing up data by storing it on magnetic tape. Window 180 is a settings editor for the data backing editor. Settings for an application program require a name for the executable file and allow setting parameters to be passed to the program at run time. A user may employ the settings editor to describe a complete action, and thus are usefully employed to add new actions to a popup menu for an object. Parameters are set in a parameter field. In the backup case, a substitution parameter "%* F:" is set. The substitution parameter "%*" is automatically filled in with the object for which the object is intended. The "F:" refers to the directory of the magnetic tape.

Referring to FIG. 8, a menu item setting editor window 182 has been opened within hard disk setting editor 176. Here the user wants to add a menu item to popup menu 172 which, when selected, will backup the contents of the hard disk to a high capacity magnetic tape. To add the item, the user specifies the utility program within a window 182, which is opened by selection of the Settings function adjacent the Primary popup menu subwindow within editor 176. Next, within the Menu Item Name field of Window 182, the user can specify a program the new menu item corresponds to. Alternatively, a utility may be provided to aid the user in finding the program. Designation of the program within window 182, opened from editor 176, automatically generates an execution file of the program with the hard disk drive as a parameter. The user may give a name to the file by typing the name in the Name field. HPFS gives the user broad latitude in selecting a name. The modified menu 172, now including a backup option, is depicted in FIG. 9.

Figure 10:
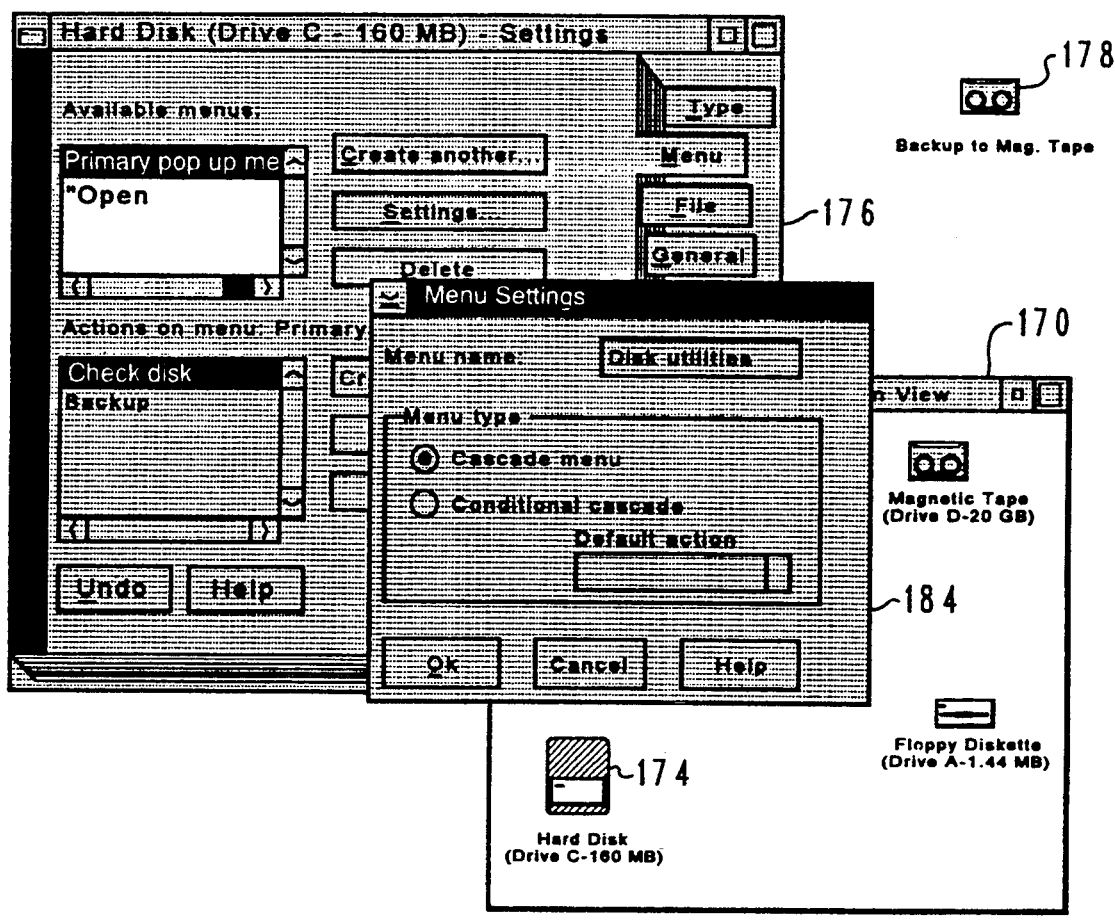
FIG. 10 is a screen representation of a submenu listing settings editor accessed from a graphical user interface.

FIG. 10 illustrates handling of a popup menu listing which is itself an index into a submenu. From editor 176 a submenu settings window 184 is opened in which the menu item name, "Disk utilities", is listed. The user can specify the menu as a conditional cascade type or a cascade type. A default action may be specified in the appropriate field if a user makes no selection in using a popup submenu and a conditional cascade submenu type has been selected.

Figure 11:
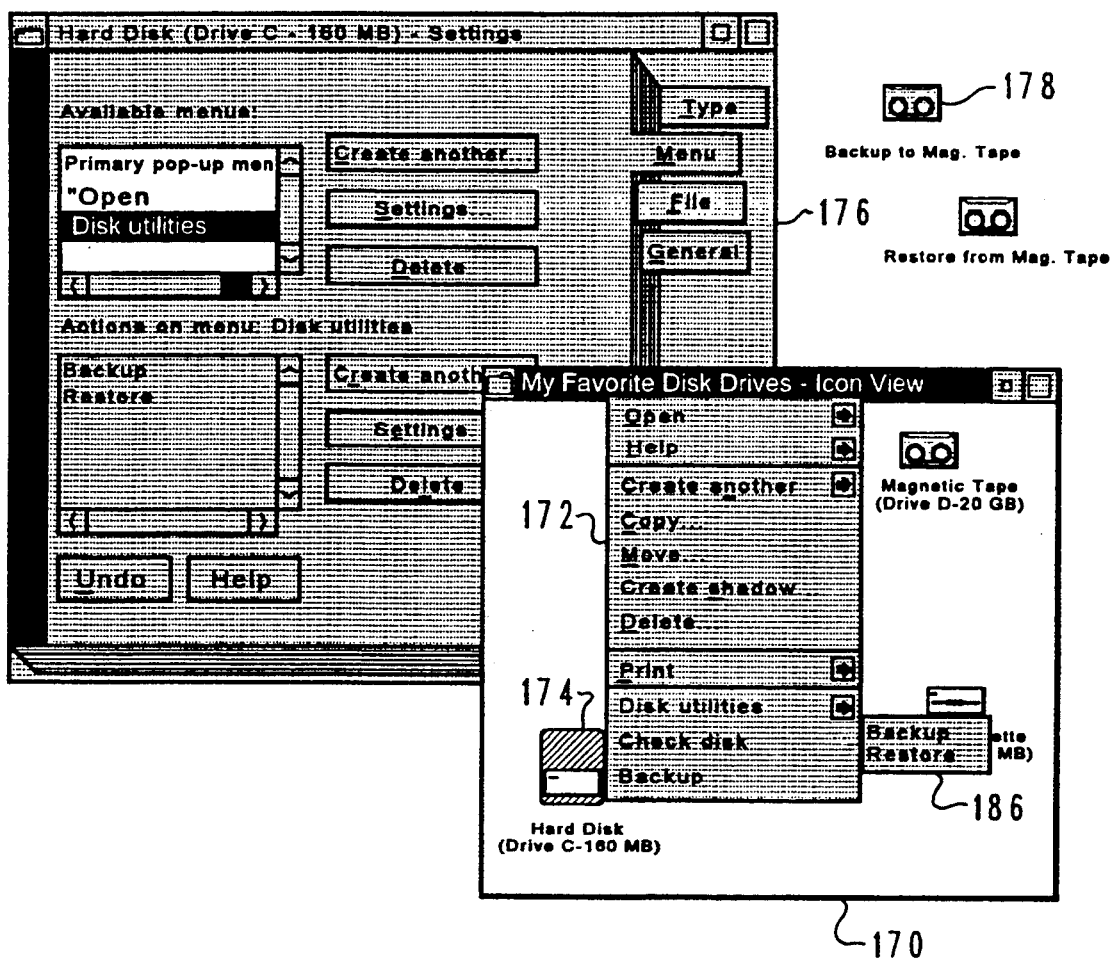
FIG. 11 is a screen representation of a user modified popup menu and submenu popup for an object in a graphical user interface.

FIG. 11 illustrates a popup menu 172 modified by a user to list a submenu "Disk utilities", selection of which results in generation of a submenu popup 186. Popup 186 is also user tailored and lists the actions "Backup" and "Restore". Settings for any menu item text, including submenus may be reset.

VI. Generation and Editing of the Popup Menus

Figure 12:
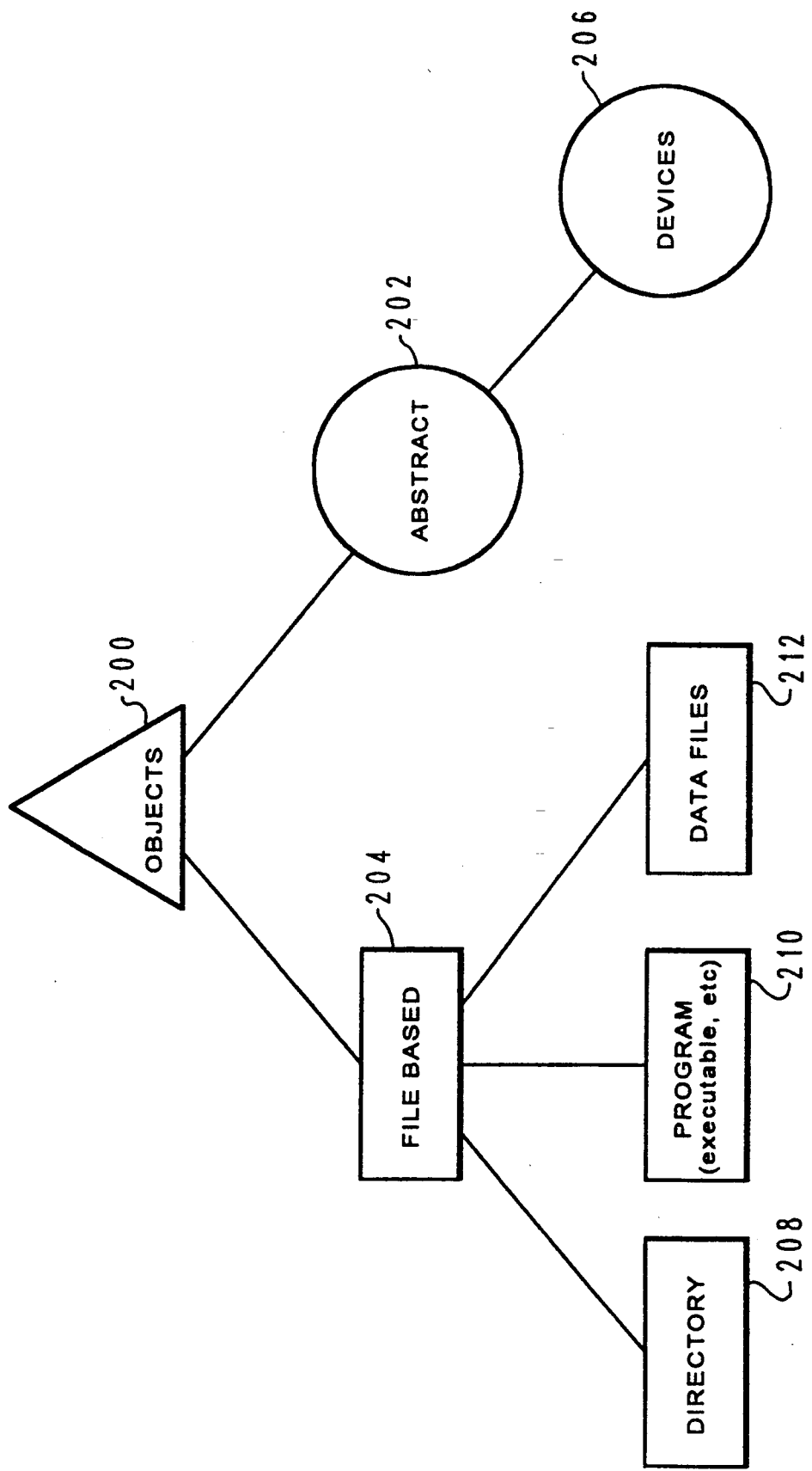
FIG. 12 is a graphical depiction of an hierarchy of objects within a computer operating system.

FIG. 12 illustrates a hierarchical relationship among data processing system objects. A root object 200 such as a computer operating system is located at the apex of the hierarchy and is a parent to all other objects either abstract 202 or file based 204. Under abstract objects 202 are devices 206 such as printers, disk drives and other input/output systems. File based objects 204 include directories 208, application programs 210 and user data files 212. Any object may receive extended attributes. A child may inherit extended attributes from its direct ancestors.

Figure 13:
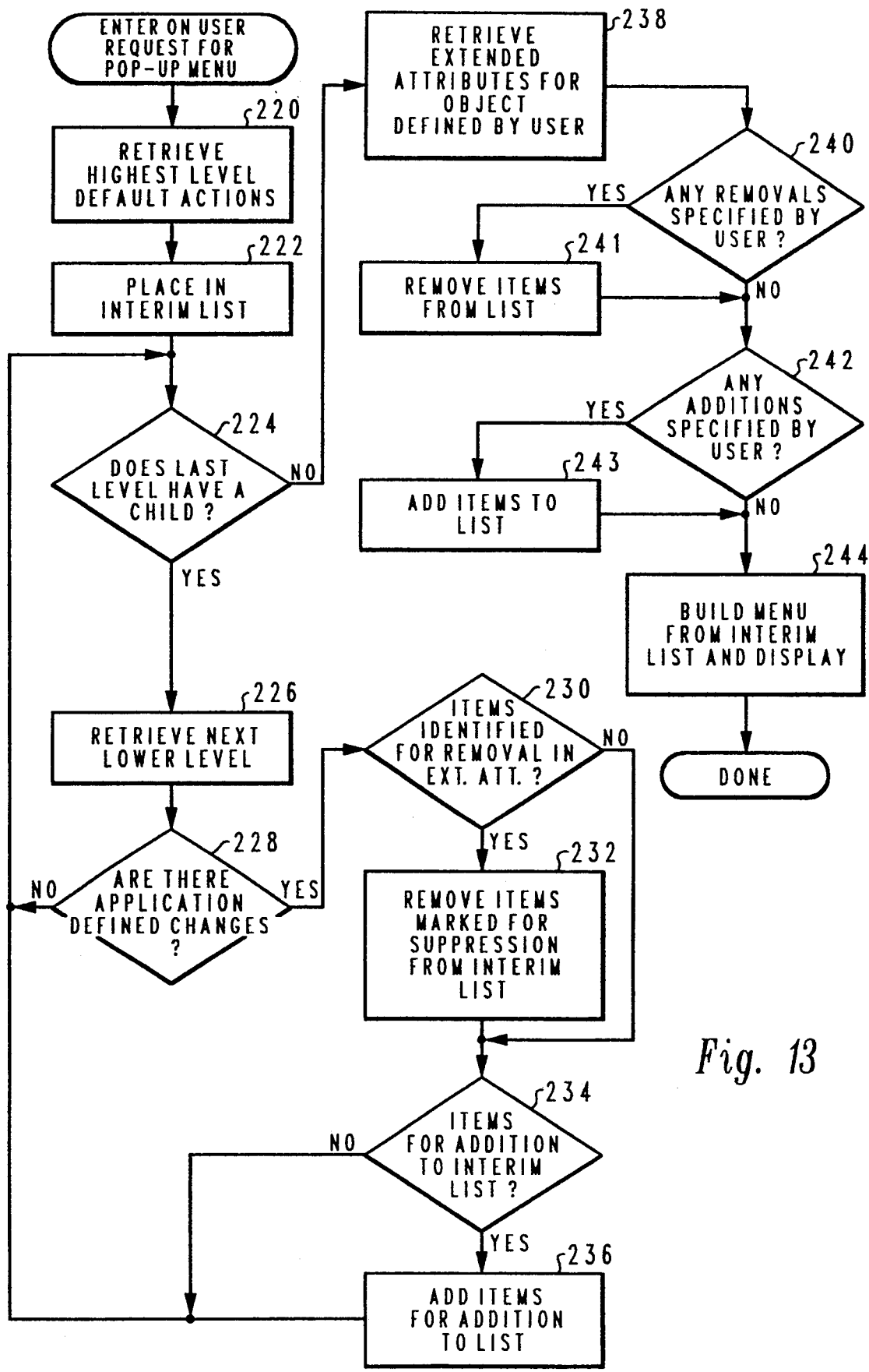
FIG. 13 is a flowchart depicting the operation of the method of the present invention.

FIG. 13 is a logical flow chart illustrating generation of a popup menu upon user request from a graphical user interface. User inputs are monitored by the computer and upon receiving request for a popup menu the process is entered at step 220. With execution of step 220 the process reads the extended attributes for the oldest parent of the current object selected in the GUI to retrieve applicable actions. Initially extended attributes added by application programs are sought. At step 222 the recovered actions are placed into an interim list.

Step 224 provided looping control through a loop executed to identify actions for an object contributed by application programs at parent levels to the object and the object itself. As long as the level in the hierarchy occupied by the selected object has not been reached, the YES branch is followed from step 224. Along the YES branch step 226 is executed to retrieve the extended attributes for the object at the next lower layer. Next in step 228 the extended attributes are examined to determine if factors are present effecting the listing of items in the popup menu. If NO, processing is returned to looping control of step 224.

The existence of items effecting the contents of a popup menu results in processing following the YES branch from step 228 to step 230. At step 230 it is determined if items have been identified for removal from the menu. To remove items the YES branch is followed to step 232 where the interim list is accordingly edited. Step 234 follows step 232 or step 230 along the NO branch. In step 234 it is determined if there are items for addition to the interim list. If YES, step 236 is executed to add the items to the interim list and processing is returned to loop control at step 224. Along the NO branch from step 234, processing is returned directly the looping control step 224.

After all levels down to the level of the object have been interrogated for application modifications to the extended attributes, the NO branch from step 224 is followed to step 238 where user entered extended attributes for an object are retrieved. Examination of user changes is done last so that user changes take priority over any application. At step 240 it is determined if the user has set markers for suppressing actions allowed by applications. Because application source code cannot conveniently be changed, override of an application is done externally through an extended attribute. If any suppression markers are present, the YES branch is followed from step 240 to step 241 where the actions are removed from the interim list.

After step 241 and after step 240 following the NO branch, step 242 is executed to determine if the user added extended attributes include actions for addition to the popup menu. If YES, step 243 is executed to add the items to the interim list. Along the NO branch from step 242 and after step 243, a menu is built from the interim list and displayed (step 244).

Figure 14:
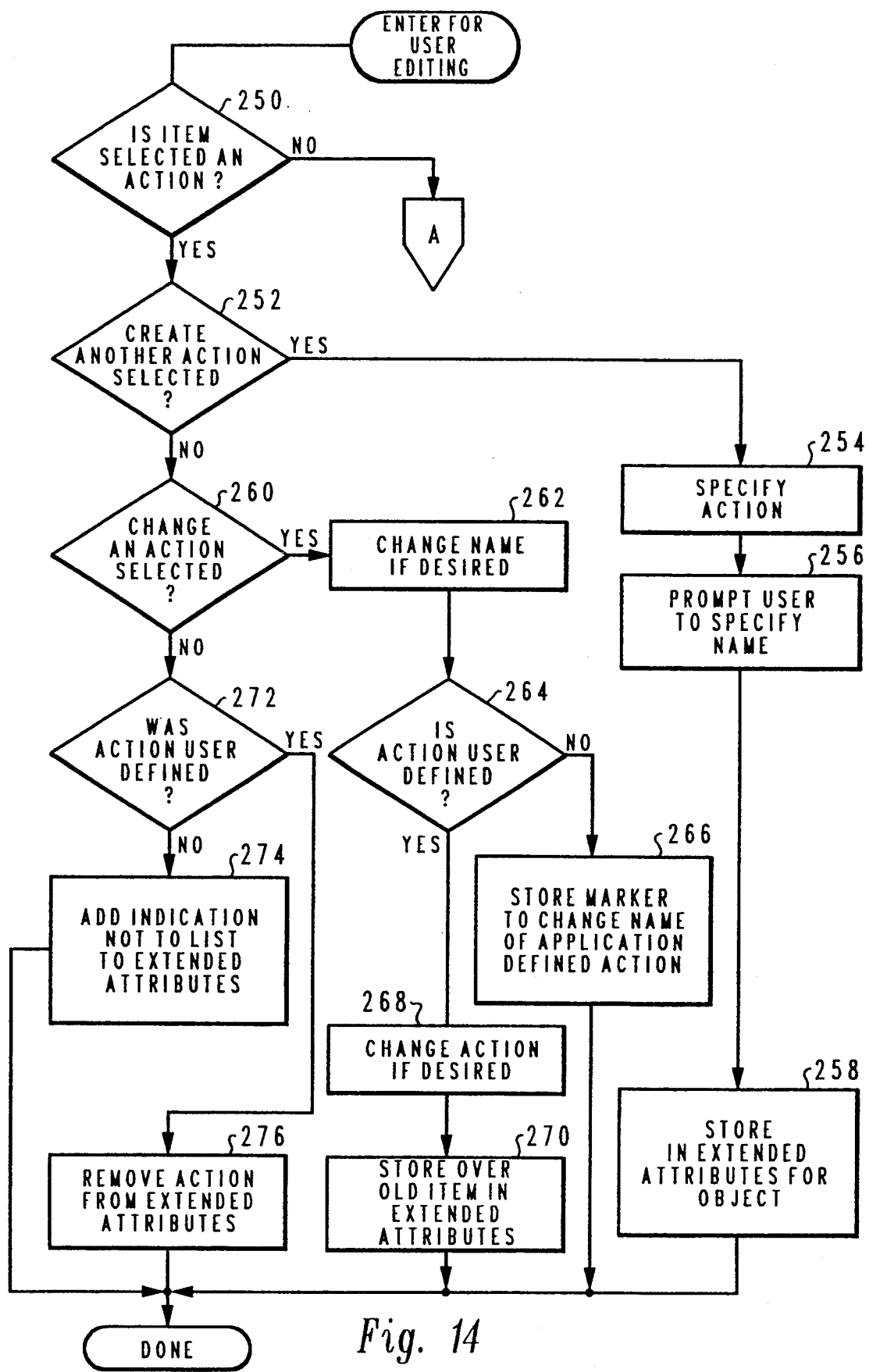
FIG. 14 is a flowchart depicting the operation of the method of the present invention.

FIG. 14 illustrates a logical process entered upon user selection of an editing function for an item in a popup menu. The process is entered at step 250 with a determination of whether the item is a pure action or a submenu item. Submenu editing is slightly different than pure action editing and is handled along the NO branch to off page connector A. If an action item is being dealt with it is determined at step 252 if the user has requested creation of another action. Following the YES branch to step 254 the user is prompted to specify the action by making an entry in the appropriate field. Next, at step 256 the user is prompted to name the item. Steps 254 and 256 may be interchanged. At step 258 the necessary extended attributes are stored to memory for the current object. Processing is then done.

If a change in an action has been selected, processing follows the NO branch from step 252 to step 260, and the YES branch is then taken to step 262. With execution of step 262 the user is prompted to enter a change of name, though no change is required. Next, at step 264, it is determined if the action was originally user defined. Application defined actions cannot be substantively changed by a user because the source code is not accessible. For application defined actions the NO branch is taken from step 264 to step 266. At step 266, a marker indicating the different name to be displayed for an application is stored as an extended attribute. Processing is then done.

User defined actions are, unlike application provided actions, open to substantive modification. Along the YES branch from step 264 step 268 is reached. There the user is prompted to change the action. Next, in step 270 the new extended attributes are stored to memory replacing the prior set of extended attributes for the menu item. Processing is then done.

If the user selected deletion of a menu item, the NO branches are taken from steps 252 and 260 to step 272. At step 272 it is determined if the action item was user defined. If it was, the extended attributes which define the actions may simply be removed and processing completed (the YES branch to step 276). Where an action is defined in application source code, it cannot be removed but only left unmentioned. Markers indicate suppression from any interim list generated for an object of such an action if the user indicates its "removal" (step 274). Processing is then done.

Figure 15:
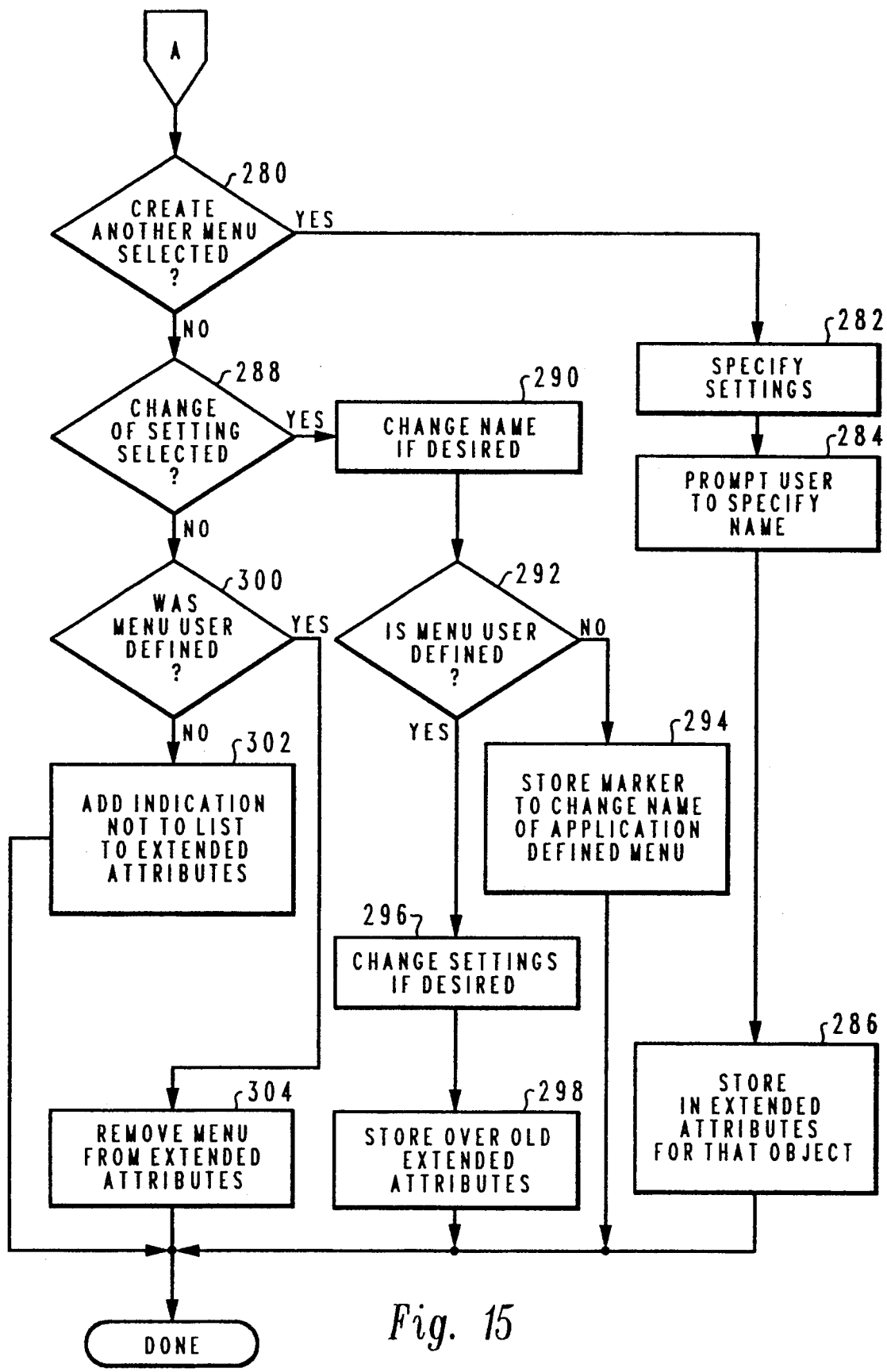
FIG. 15 is a flowchart depicting the operation of the method of the present invention.

FIG. 15 depicts processing following the off page connector A from FIG. 14. At step 280 it is determined if the user has selected the editing function of create another menu. If YES, step 282 follows where the user is prompted to specify settings, e.g. whether the submenu is to be a cascade type or a conditional cascade type. At step 284 the user may respond to a prompt to specify a name for the item. Then at step 286 extended attributes for the current object are stored to define the menu item listing.

Where a change in settings is selected, processing follows the NO branch from step 280 to step 288. In step 288 the request for change of settings is detected and processing is directed to step 290. At step 290 the user is allowed to change the name of the submenu as listed in the popup menu. Next, at step 292 it is determined if the submenu is user defined (and therefore one that admits substantive change). If NO, processing is directed to step 294 to store an extended attribute indicating the change of name to be displayed. Processing is then exited.

Where a menu is user defined, processing is directed from step 292 down the YES branch to step 296 which indicates user changes in the program are accepted. Next, at step 298 the extended attributes are replaced in long term storage. Processing is then completed.

Where deletion of a submenu has been requested, the NO branches from steps 280 and 288 are followed to step 300. At step 300 it is determined if the submenu was established by the user. If NO, the code for the submenu cannot be deleted. At step 302 extended attributes are stored indicating that the submenu is not be listed in the interim list. If the submenu is user defined, processing follows the YES branch to step 304 where the extended attributes establishing the listing are deleted. Processing is then done.

The present inventor recognized that the typical user can use different applications, possibly provided by different vendors, to modify, store, backup, transmit or otherwise handle a particular object. The invention allows the user to collect those items into a single list associated with the object which can be conveniently accessed. In addition, certain permissible operations with a potential for havoc (e.g. a disk format operation) may be removed from a menu to make them relatively inaccessible. The patent is directed to improving user productivity by increasing the intuitive feel of the graphical user interface.

While the invention has been particularly shown and described with reference to a preferred embodiment, it will be understood by those skilled in the art that various changes in form and detail may be made therein without departing from the spirit and scope of the invention.

What is claimed is:

1. A method of generating menus of actions for objects depicted in a graphical user interface for a data processing system comprises the steps of:
    interrogating extended attributes for an object and for parent objects to the object for actions and action suppression markers, which were placed as extended attributes by applications;
    with interrogation of the extended attributes for the object or a parent object, adding actions to an interim list listed in the extended attributes and removing actions from the interim list identified by suppression markers by any application;
    after interrogation of any extended attributes for the object added by an application, determining if any user defined actions and suppression markers are present in extended attributes for the object;
    if the result of the determining step is affirmative, adding the user defined actions to the interim list and removing actions matched by the suppression markers from the interim list;
    editing the extended attributes by:
        prompting user selection of one of a plurality of editing functions including creation of a new action, change of an existing action and removal of an existing action for an object;
        responsive to user selection of the step of creating a new action further prompting a user to select the action and to name the action;
        storing the new action to the extended attributes for the object; responsive to user selection of the step of changing an existing action, allowing the user to select a new name for the existing action and further determining if the existing action is user created;
        responsive to determination that an existing action is user created, allowing the user to change the existing action;
        responsive to user selection of removal of an existing action, determining if the existing action was user defined;
        if the existing action is user defined, removing the action from the extended attributes for the object;
        if the existing action is not user defined, adding a suppression marker for the action to the extended attributes for the object;
        storing a changed action over an existing action in the extended attributes if the existing attribute was user created;
        if the existing action was not user created, storing a marker in the extended attributes for an object so that the changed name is recovered at the time of request for the popup menu; and 2. A method of generating a menu of actions for an object in a graphical user interface as set forth in claim 1, wherein the step of editing the extended attributes further includes:
    creating a program object corresponding to an application program; and
    generating extended attributes for the program object including actions and action suppression markers.

3. A method of generating a menu of action for an object in a graphical user interface as set forth in claim 2, wherein actions include submenus.

4. A method of generating a menu of actions for an object in a graphical user interface as set forth in claim 1, wherein the menu is a pop up menu.

5. A data processing system comprising:
    an object oriented graphical user interface;
    a storage medium including extended attributes for an object and each parent object to the object for linking the object to actions and for marking actions as suppressed;
    means responsive to user selection of a popup menu for an object, for interrogating extended attributes for the object and each parent object to the object for action links and action suppression markers;
    means responsive to interrogation of the extended attributes for the object, or a parent object, for adding actions to an interim list if listed in the extended attributes and for removing actions from the interim list if identified by suppression markers;
    means responsive to loading of an application program on the storage medium for modifying extended attributes for the application program; and
    editing means responsive to user selection for modifying extended attributes for an object represented by the graphical user interface, said editing means comprising:
        means for prompting user selection of one of a plurality of editing functions including creation of a new action, change of an existing action and removal of an existing action for an object;
        means responsive to user selection of creation a new action for further prompting a user to define the action and to name the action;
        means for storing the new action to the extended attributes for the object;
        means responsive to user selection of change in an existing action for allowing the user to select a new name for the existing action and for further determining if the existing action is user created;

means responsive to determination that an existing action is user created for allowing the user to change the existing action;

means responsive to user selection of removal of an existing action for determining if the existing action is user defined;

means responsive to determination that the existing action is user defined for removing the existing action from the extended attributes for the existing object;

means responsive to determination that the existing action is not user defined for adding a suppression marker for the existing action to the extended attributes for the object;

means for storing a changed action over an existing action in the extended attributes if the existing action was user created;

means responsive to determination that an existing action was not user created for storing a marker in the extended attributes for an object so that the changed name is recovered at time of request for the popup menu;

means for determining if any user defined actions and suppression markers are present in extended attributes for the object;

means responsive to determination of the presence of user defined actions and suppression markers for adding the user defined actions to the interim list and removing actions matched by the suppression markers from the interim list; and means for displaying the interim list as a menu.

6. A data processing system as set forth in claim 5, wherein the means responsive to loading of an application program on the storage medium for modifying extended attributes for the application program includes:

means for creating a program object corresponding to an application program; and means for writing extended attributes for the program object including actions and action suppression markers to the storage medium.

7. A data processing system as set forth in claim 6, wherein actions include submenus.

* * * * *